United States Patent [19]

Reynolds

[11] Patent Number: 4,502,346
[45] Date of Patent: Mar. 5, 1985

[54] VARIABLE MECHANICAL ADVANTAGE TORQUE ARM

[75] Inventor: Joseph D. Reynolds, Climax, Mich.

[73] Assignee: Eaton Corporation, Cleveland, Ohio

[21] Appl. No.: 436,137

[22] Filed: Oct. 22, 1982

[51] Int. Cl.³ .......................... G05G 9/18; G05G 7/04; F16D 23/06
[52] U.S. Cl. ......................... 74/339; 74/470; 74/473 R; 74/516; 74/522; 192/53 E; 192/995
[58] Field of Search ................ 74/339, 470, 473 R, 74/516, 517, 522; 192/53 E, 53 F, 995

[56] References Cited

U.S. PATENT DOCUMENTS

| | | | |
|---|---|---|---|
| 763,548 | 6/1904 | Ferguson | 74/792 X |
| 787,418 | 4/1905 | Westman | 74/792 |
| 1,099,464 | 6/1914 | Olson | 74/789 |
| 1,138,718 | 5/1915 | Adams | 74/792 |
| 2,040,594 | 5/1936 | Bixby | 74/476 |
| 2,385,734 | 9/1945 | Silva et al. | 192/995 X |
| 2,414,832 | 1/1947 | Orr | 74/792 |
| 2,900,970 | 8/1959 | Sims et al. | 74/516 X |
| 3,221,851 | 12/1965 | Vandervoort | 192/53 |
| 3,857,299 | 12/1974 | Morrison | 74/473 R |
| 4,104,929 | 8/1978 | Kessmar | 74/473 R |
| 4,269,282 | 5/1981 | Meacock et al. | 74/473 R X |
| 4,275,612 | 6/1981 | Silvester | 74/473 R |

FOREIGN PATENT DOCUMENTS

| | | | |
|---|---|---|---|
| 599088 | 5/1960 | Canada | 74/792 |
| 462352 | 3/1951 | Italy | 74/516 |
| 169208 | 8/1934 | Switzerland | 74/516 |
| 383375 | 11/1932 | United Kingdom | 74/792 |

Primary Examiner—Allan D. Herrmann
Attorney, Agent, or Firm—C. H. Grace; H. D. Gordon

[57] ABSTRACT

A variable mechanical advantage/variable effective length torque arm assembly (100) for a synchronized transmission is provided. The torque arm assembly comprises a substantially rigid body (102) fixedly mounted to a shift shaft (36) at one end (104) thereof for axial and rotational movement therewith. The body is provided with an axially extending elongated slot (106) in which a pivot pin (124) is received for pivotably attaching an axially movable control rod (22) to the body of the torque arm assembly. A biasing spring (134) bias the pivot pin to a first end of the slot closer to the axis of the shift shaft to define a first effective length (138) of the torque arm assembly which biasing force may be overcome by a sufficient resistance to rotation of the shift shaft (36) allowing the pivot pin to move away from the axis of the shift shaft to define a second effective length (140) of the torque arm assembly greater than the first effective length.

10 Claims, 12 Drawing Figures

VARIABLE MECHANICAL ADVANTAGE TORQUE ARM

BACKGROUND OF THE INVENTION

1. Field of the Invention

The present invention relates to variable mechanical advantage/variable effective length torque arm assemblies and in particular to variable mechanical advantage/variable effective length torque arm assemblies for applying a torque to a rotationally or pivotably mounted member, such as the shift shaft in a shift bar housing assembly of a remotely controlled change gear transmission.

2. Description of the Prior Art

Torque arm assemblies for applying a torque to selectively rotate the shift shaft of a shift bar housing assembly of a remotely controlled transmission are well known in the prior art. Such torque arm assemblies are usually also utilized to apply a selective axial movement to the shift shafts of the shift bar housing assemblies. Shift bar housing assemblies of this type for remotely controlled transmissions may be seen by reference to U.S. Pat. Nos. 2,040,594; 3,857,299; 4,104,929; 4,266,438; 4,269,282 and 4,275,612 all of which are hereby incorporated by reference. Typically, such shift bar housing assemblies comprise a plurality of axially slidable shift rails each of which carry a shift fork or yoke thereon. A transversely mounted shift shaft is rotatably and axially movably mounted in the shift bar housing assembly and carries a shift finger fixed thereto. The shift shaft is selectively axially moved in a direction transverse to the axis of the shift rails to align the shift finger with the shift block assembly on a selected shift rail and then the shift shaft is selectively rotated to cause the shift finger to engage the shift block assembly to impart a desired axial movement to the selected shift rail and shift fork carried thereby.

Selected rotational and axial movement of the shift shaft is accomplished by means of a control rod which extends generally transverse to the shift shaft and which may be selectively axially moved and/or rotated about its axis. A torque arm assembly is pivotably mounted to an end of the control rod and fixedly mounted to an end of the shift shaft whereby rotational movement of the control rod will impart an axial movement to the shift shaft and an axial movement of the control rod will impart a rotational movement to the shift shaft. Typically, rotational and or axial movement of the control rod is imparted by a first class shift lever master control which is attached to the control rod by means of a crank assembly. As is known, the mechanical advantage of the torque arm assembly when applying a torque to the shift shaft is directly proportional to the effective length of the torque arm assembly and the required axial movement of the control rod to achieve a given rotational movement of the shift shaft is also directly variable with the effective length of the torque arm assembly. In prior art remote control shift mechanisms of the type described above, the effective length of the torque arm assembly is usually a compromise between the desired mechanical advantage and a desire to minimize the required axial movement of the control rod, and associated pivotal movement of the master control shift lever, to achieve a given rotational movement of a selected shift rail.

Synchronized mechanical transmissions are well known in the prior art and may be seen by reference to U.S. Pat. Nos. 4,307,624; 3,929,029 and 3,221,851 all of which are hereby incorporated by reference. Typically, such transmissions comprise constantly meshed gears on parallel shafts with synchronized positive clutches to selectively clutch a selected one of the gears for rotation with one of the shafts. Such synchronized positive clutches typically comprise an axially fixed positive clutch member (usually fixed to a gear) and an axially slidable positive clutch member (usually splined to a shaft for rotation therewith an axial movement relative thereto) movable towards and away from the fixed clutch member. The axially slidable positive clutch member is axially mounted on the shaft and movable toward and away from a fixed positive clutch member by a shift fork or the like. A blocking mechanism is provided interposed the two positive clutch members to prevent engagement of the positive clutch members if they are not rotating at a synchronous or substantially synchronous speed. A relatively high torque capacity friction synchronizer clutch is provided for causing the two positive clutch members to rotate at a synchronous speed, such friction synchronizer clutch being applied by the axially movable positive clutch member usually through the blocker means. When the positive clutch members are caused to rotate at a substantially synchronous speed, the blocker mechanism will "unblock" allowing the axially movable positive clutch member to move axially therethrough and into positive engagement with the axially fixed positive clutch member. In transmissions carrying relatively large torque loads, such as mechanical change gear transmissions for heavy duty trucks, the axial force required to properly engage the frictional synchronizing clutches is considerable. The axial movement of the axially movable positive clutch member from a fully disengaged to a fully engaged position may be separated into three distinct segments. The first segment is an initial movement of the axially movable positive clutch member into engagement with the blocker and initial engagement of the frictional synchronizing clutch. This first segment of axial movement typically requires a relatively small axial movement and a relatively low axial force. The second segment of axial movement is an intermediate axial movement to fully frictionally engage the synchronizer clutch sufficiently to cause synchronization of the positive clutch members. This second segment of axial clutch movement requires very little axial movement (typically a compression of the frictional materials) and a relatively high axial force. The third segment of axial movement is a final clutch movement after synchronization has been achieved and the unblocking means has unblocked wherein the axially movable clutch member moves through the blocker and into engagement with the other clutch member. This final segment of axial movement typically requires a relatively low axial force and a relatively large axial travel.

The prior art shift mechanisms of the type utilizing torque arm assemblies for synchronized mechanical transmissions for heavy duty vehicles were not totally satisfactory as if the torque arm assembly was of a large enough effective length to provide a satisfactory mechanical advantage, the required axial movement of the control rod was larger than desired and often objectionable, especially if the master control is located in the cab of a heavy duty truck where space for movement of the master control is often very limited and if the torque arm assembly was of a short enough effective length to provide an acceptable axial travel of the control rod the mechanical advantage of the torque arm assembly was reduced requiring an often objectionable amount of driver effort to fully engage the frictional synchronizing clutches.

SUMMARY OF THE INVENTION

In accordance with the present invention, the drawbacks of the prior art have been overcome or minimized by the provision of a variable mechanical advantage/variable effective length torque arm assembly for applying a torque to a member fixed for rotation therewith. The torque arm assembly includes a generally rigid member or body having means for mounting the member to be rotated for rotation therewith adjacent one end thereof and means for pivotably receiving a member for applying a substantially axial force adjacent the other end thereof. One of the means for mounting the member to be rotated and the means for mounting the member for imparting a substantially axial force is movable towards and away from the other mounting means and resilient means are utilized to urge the movable mounting means in a position closest the other mounting means. In the preferred embodiment, the torque arm assembly comprises a rigid body having means for fixedly mounting the member to be rotated adjacent one end thereof and an elongated slot for pivotably receiving the member for applying a substantially axial force adjacent the other end thereof. The resilient means are utilized to bias the means for applying a substantially axial force towards the end of the slot closest the member to be rotated. The resilient means is sufficient to maintain the pivotably mounted end of the member for applying an axial force in a position closest the member to be rotated when resistance to rotation of the member to be rotated is less than a predetermined limit but is insufficient to prevent movement of the pivotably mounted end of the member for applying an axial force away from the member to be rotated to define a longer effective length for the torque arm assembly when resistance to rotation of the member to be rotated exceeds a predetermined limit.

Accordingly, it is an object of the present invention to provide a new and improved torque arm assembly.

Another object of the present invention is to provide a new and improved variable mechanical advantage/variable effective length torque arm assembly for mechanically operated transmission controls for synchronized positive clutch type transmissions.

These and other objects and advantages of the present invention will become apparent from a reading of the description of the preferred embodiments taken in view of the attached drawings.

DESCRIPTION OF THE PREFERRED EMBODIMENT

In this disclosure, certain terminology will be used for convenience in reference only and will not be limiting. For example, the terms "forward" and "rearward" will refer to directions and forward and rearward of the vehicle in which the transmission is installed. The terms "rightward" and "leftward" will refer to directions as taken in the drawings in connection with which the terminology is used. The terms "inward" and "outward" will refer to directions toward and away from, respectively, the geometric center of the apparatus. The foregoing applies to normal derivatives of the above mentioned terms and terms of similar import.

The present invention is related to copending U.S. patent application Ser. No. 419,851, entitled Variable Mechanical Advantage Shift Lever filed Sept. 20, 1982, and assigned to the assignee of this invention.

Figure 1:
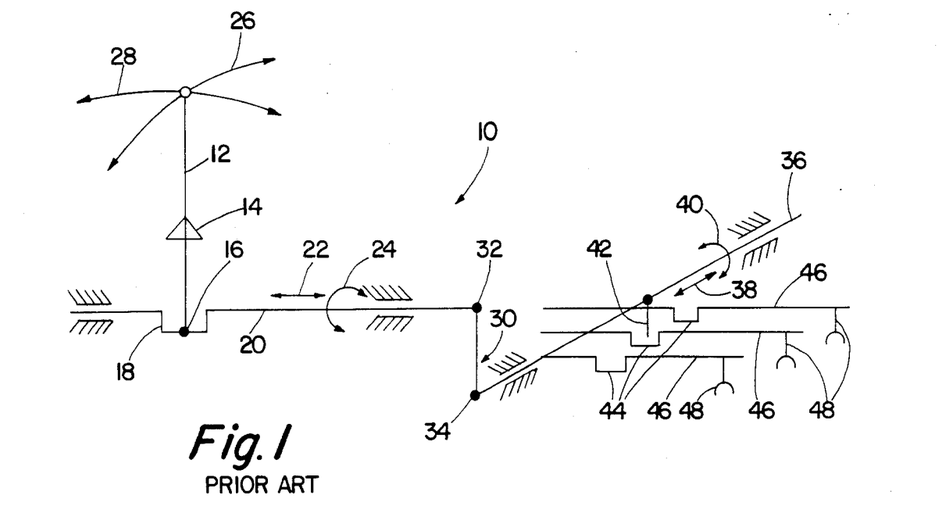
FIG. 1 is a schematic illustration of a typical prior art manually operated remote control transmission shifting mechanism utilizing a torque arm assembly.

Referring now to FIG. 1, a manually operated remote control assembly 10 of the type in which the variable mechanical advantage/variable effective length torque arm assembly of the present invention is especially advantageously utilized is illustrated. Remote controls for change gear transmissions are well known in the prior art and are especially advantageously utilized in motor vehicles such as trucks of the "cab over engine" type which permits locating of the driver seat at the extreme front of the vehicle, thereby permitting the use of space commonly occupied by the cab for loading space. Remote controls of this type may be seen in greater detail by reference to U.S. Pat. Nos. 2,040,594; 4,104,929; 4,269,282 and 4,275,612 previously mentioned above. Briefly, remote control assembly 10 comprises a shift lever 12 which is pivotably attached at a tower assembly 14 and which has one end 16 thereof attached to a crank mechanism 18 of a control rod 20. Control rod 20 is supported in a support member for axial movement along its axis as indicated by arrow 22 and rotation about its axis as indicated by arrow 24 whereby rightward or leftward pivotal movement of the shift lever as indicated by arrow 26 will result in a rotational movement of control rod 24 about its axis and forward and rearward movement of shift lever 12 as indicated by arrow 28 will result in a corresponding opposite axial movement of control rod 20 in the direction of arrow 22. A torque arm 30 is pivotably mounted about a pivot axis transverse to the axis of control rod 20 at one end 32 thereof to the control rod 20 and is fixedly mounted at the other end 34 thereof to a shift shaft 36.

Shift shaft 36 is supported in a shift bar housing assembly of a known type for movement along its axis in the direction of arrow 38 and rotation about its axis in the direction of arrow 40. The axis of shift shaft 36 is generally transverse to and spaced from the axis of control rod 20. Shift shaft 36 carries a shift finger 42 fixed thereto which may be aligned with the shift block members 44 carried by a plurality of generally parallel shift rails 46 extending generally transverse to the axis of shift shaft 36. Each of the axially movable shift rails 46 carry a shift fork 48 fixed thereto as is well known in the art. As may be seen, and as is well known in the art, a rotational motion of control rod 20 will result in torque arm 30 pivoting in a plane perpendicular to the axis of control rod 20 and containing the axis of shift shaft 36 whereby an axial movement will be applied to shift shaft 36 to selectively align shift finger 42 with the shift block 44 of a selected shift rail 46. An axial movement of control rod 20 will result in torque arm 30 pivoting about the axis of shift shaft 36 in a plane perpendicular to the axis of shift shaft 36 thereby imparting a rotational movement to shift shaft 36 and shift finger 42 carried thereby to selectively axially move the selected shift rail 46 and shift fork 48 carried thereby. The specific structure of the remote control shift mechanism described above, and known modifications thereof utilizing torque arm assemblies, are illustrated as a matter of example only, rather than of limitation, and is intended to describe an especially suitable environment for the variable mechanical advantage/variable effective length torque arm assembly of the present invention.

Figure 2:
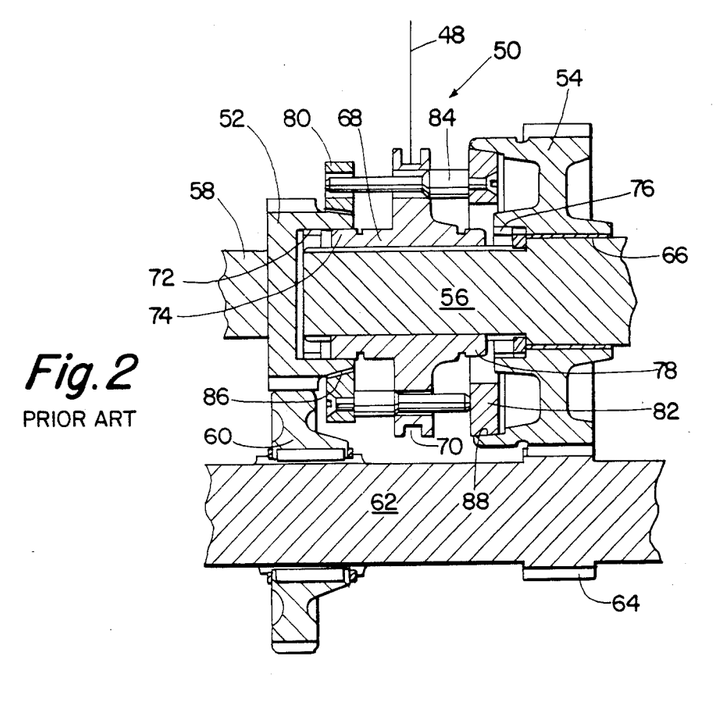
FIG. 2 is a partial sectional view of a gear group including a typical prior art synchronized positive clutch assembly.

FIG. 2 illustrates a typical synchronized positive clutch assembly 50 for selectively engaging one of two selectable gears 52 or 54 to a driven shaft 56. The specific structure of the gearing and of the clutch assembly 50 is shown for illustrative purposes only and is not intended to be limiting. Briefly, gear 52 is fixed for rotation with a shaft 58 which may be the input shaft of a transmission or a transmission section. Gear 52 is constantly meshed with a countershaft gear 60 which is fixed for rotation on a countershaft 62 which additionally carries a gear 64 fixed for rotation therewith. Gear 64 is in constant meshing engagement with gear 54. Gear 54 is provided with an annular bushing 66 allowing gear 54 to rotate relative to shaft 56 when not positively clutched thereto.

Synchronized positive clutch assembly 50 may be shifted rightwardly to engage gear 54 with shaft 56 or may be shifted leftwardly to engage gear 52 with shaft 20. Synchronized positive clutch assembly 50 includes a double ended axially movable clutch member 68 which is splined to shaft 56 for axial movement relative thereto and rotation therewith. Clutch member 68 is provided with a generally annular groove 70 for receipt of a shift fork 48 as is well known in the art. Gear 52 is provided with internal positive clutch teeth 72 for engagement with external clutch teeth 74 on the leftward end of clutch member 68 and gear 54 is provided with internal clutch teeth 76 for engagement with external clutch teeth 78 carried by the rightward end of clutch member 68 conical frictional clutch members 80 and 82 are carried on the leftward and rightward, respectively, ends of synchronizer pins 84 for frictional synchronizing engagement with conical frictional surfaces 86 and 88 carried by gears 52 and 54 respectively. As is well known in the art of synchronized transmissions, initial axial movement of clutch 68 from the disengaged position shown will result in the synchronizer pins 84 preventing further axial movement if the positive clutch members are not at synchronous or substantially synchronous rotation and will cause the friction surfaces to engage. With sufficient axial force on the friction surfaces, the shaft 56 and clutch member 68 which rotates therewith will be caused to rotate at a synchronous or substantially synchronous speed with the selected gear and positive clutch teeth carried thereby. Upon achievement of a substantially synchronous rotation of the positive clutch members, the blocker or synchronizer pins 84 will cease to prevent further axial movement of clutch member 68 and the clutch member 68 will move through the blocked position into engagement with the selected gear.

The initial movement of the clutch member 48 to cause the blocker to engage and to result in initial contact of the friction surfaces requires a relatively small axial movement and a relatively small axial force. The axial force required to engage the friction members sufficiently to bring the positive clutch members into synchronous or substantially synchronous rotation requires a relatively small axial movement (essentially compression of the friction material) but a relatively large axial force. Upon achievement of synchronous or substantiall synchronous rotation of the positive clutch members and subsequent unblocking of the blocker mechanism, further axial movement of the axially movable clutch member 68 through the blocking mechanism and into positive engagement with the selected positive clutch member requires a relatively large axial movement with a relatively small axial force. The above described operation of a synchronized positive clutch assembly is well known in the prior art, as are various modifications thereof, and the specific structure of the synchronizer clutch assembly forms no part of the present invention.

Figures 3, 5:
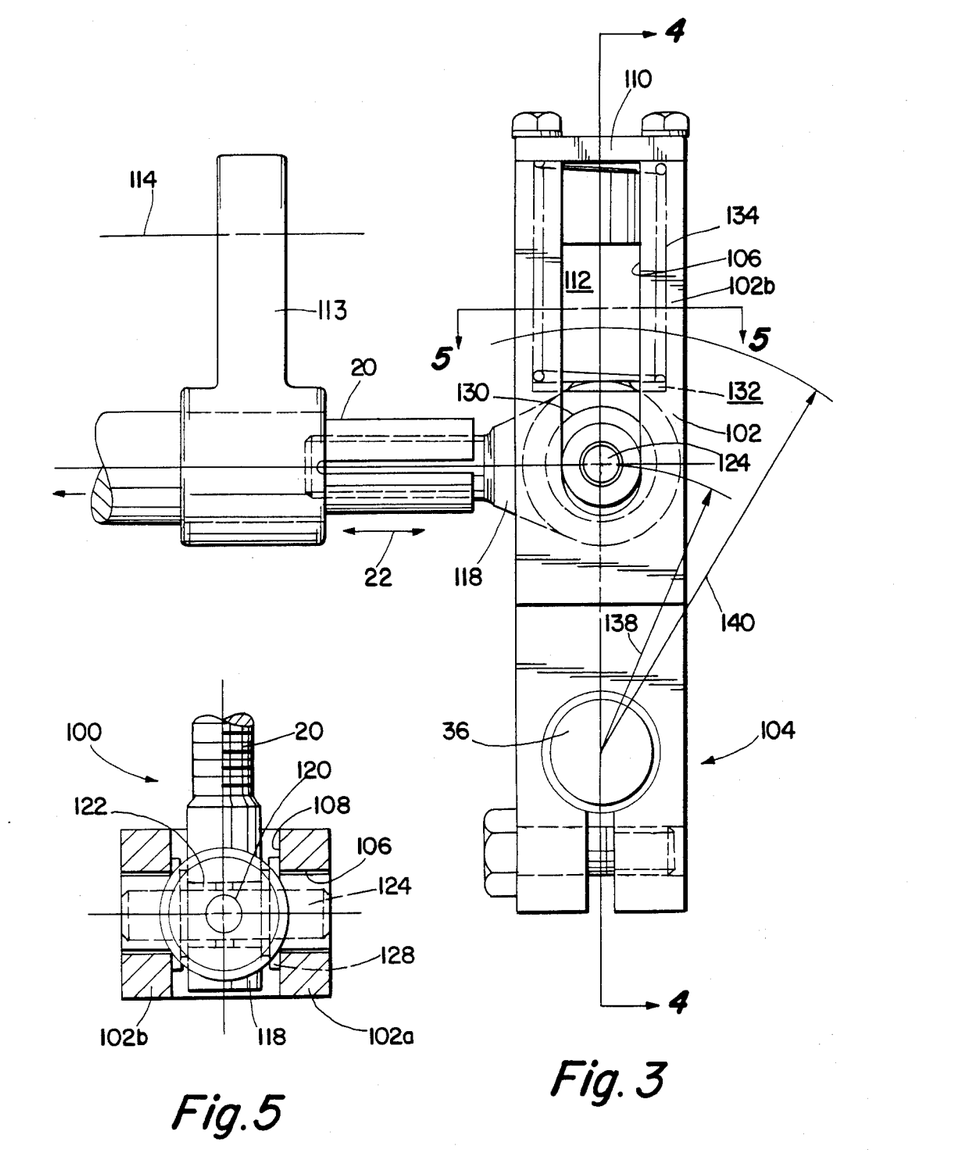
FIG. 3 is a side elevational view of the preferred embodiment of the variable mechanical advantage/variable effectie length torque arm assembly of the present invention.
FIG. 5 is top view of the variable mechanical advantage shift lever assembly of the present invention taken along line 5—5 in FIG. 4.
Figure 4:
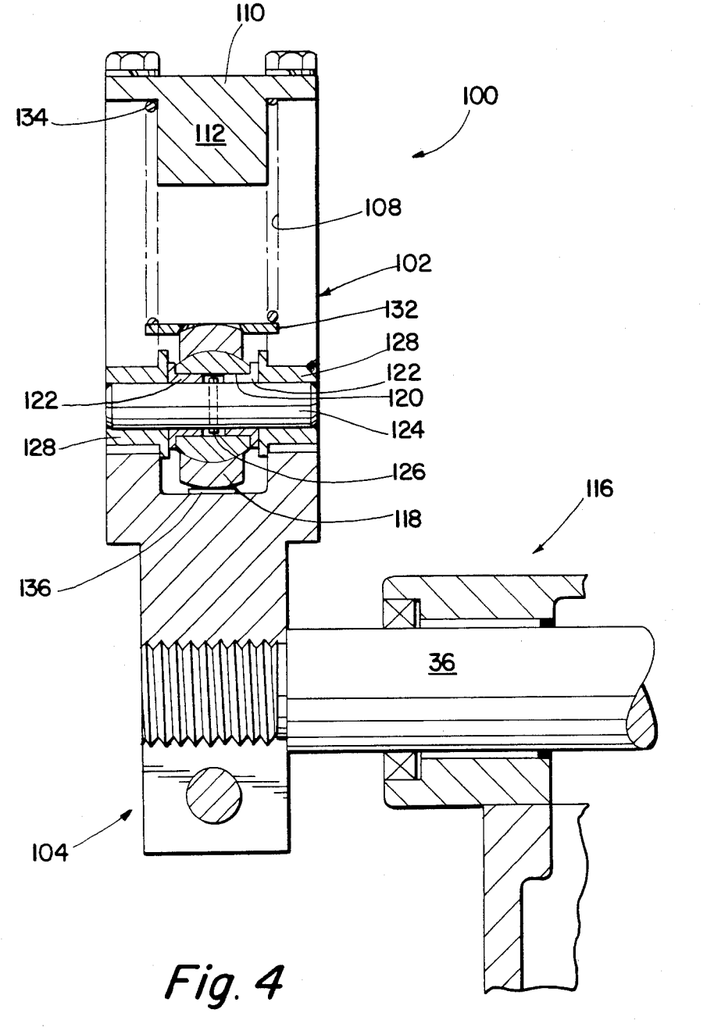
FIG. 4 is a rear view of the variable mechanical/variable effective legth torque arm assembly of FIG. 3.

The structure and operation of the variable mechanical advantage/variable effective length torque arm assembly 100 of the present invention may be seen in greater detail by reference to FIGS. 3-6. In FIGS. 3, 4 and 5 the torque arm assembly 100 is illustrated in the neutral or generally vertical position as seen in FIG. 1. The torque arm assembly 100 includes a generally rigid body 102 fixedly mounted at end 104 thereof to the end of the shift shaft 36 for axial and rotational movement therewith. The body 102 may be mounted to the end of shift shaft 36 for rotational and axial movement therewith by means of a clamping and/or spline connection or other known connecting means and the manner by which the body 102 is mounted to the shift shaft forms no part of the present invention. Rigid body 102 defines an axially extending elongated slot 106 extending generally transversely to the axis of control rod 20. The slot 106 is provided in the generally parallel biforcated upper side walls 102a and 102b of body 102 which define a second axially extending elongated slot 108 extending generally transversely to the axis of shift shaft 36 therebetween. Slot 106 and 108 intersect as may be seen by reference to FIG. 5. The upper ends of both slots 106 and 108 are defined by a cap member 110 which may be bolted to the upper end of the body 102 and may include a projection 112 defining a spring seat and guide member.

The end of control rod 20 is supported for axial movement and rotation about its axis by a support member 113 which may itself be pivotably mounted about a pivot axis 114 to a support structure fixed to the transmission shift bar housing assembly 116. An eyelet type rod end 118 is mounted to control rod 20 for rotational and axial movement therewith. Of course, rod end 118 could be integral with control rod 20. Rod end 118 is received in slot 108 and is provided with a through bore 120 into which are pressed axially outwardly flanged bushings 122. A pin member 124 is received within the inner bore of the bushings 122 and a roll pin 126 may be utilized to maintain the pin 124 within rod end 118. Pressed upon the outer ends of pin 124 are axially inwardly flanged bushings 128. As may be seen by reference to FIG. 3, the outer diameter of the flanges 130 of bushings 128 is greater than the width of slot 106 and thus maintain the rod end 118, pin 124, bushings 122 and bushings 128 assembly slidably located within slot 106. The hub portion of bushings 128 surrounding pin 124 are preferably of a low friction material and allow the assembly to be axially slidable in slot 106. A washer member 132 rests upon the upper surface of rod end 118 and provides a spring seat for a compression spring 134 compressed between the spring seat and guide 112 and washer 132 to urge the rod end 118 downwardly in slot 106. A resilient bumper member 136 may be provided at the bottom of slot 106 to prevent damage to the rod end 118. Rod end 118 is received through slot 108 while pin member 124 and bushings 128 are slidably received within slot 106.

The axial separation of the axialy outer surfaces of bushings 128 is generally equal to the width of slot 108 whereby a rotation of control rod 20 and rod end 118 about the axis of control rod 20 will impart a pivotal movement of body 102 about the axis of control rod 20.

As may be seen by reference to FIG. 3, an axial movement of control rod 20 and rod end 118 attached thereto in the direction of arrow 22 will result in a pivotal movement of torque arm assembly 100 about the rotational axis of shift shaft 36 thereby rotating shift shaft 36 and shift finger 42 fixed thereto. As may be seen by reference to FIGS. 4 and 5, a rotation of control rod 22 about its axis will result in torque arm assembly rotating with the control rod about the axis of the control rod and thus end 104 of torque arm assembly 100 pivoting about the axis of control rod 22 imparting an axial movement to shift shaft 36.

As is known, when imparting a rotational movement to shift shaft 36, torque arm assembly 100, where the rod end is in the resiliently biased position at the bottom end of slot 106 defines a effective torque arm length 138 measured from the rotational axis of shift shaft 36 to the pivot axis of rod end 118. However, if the resistance to rotation of shift shaft 36 exceeds a predetermined limit the bias of spring 134 will be overcome and the rod end 118, pin 124 and bushing 128 will slide upwardly against the bias of spring 134 to obtain an increased mechanical advantage by increasing the effective length of torque arm 110 to a effective length 140. Once the resistance to rotational movement of shift shaft 36 falls below the predetermined resistance to rotation required to overcome the bias of spring 134, spring 134 will force rod end 118 and pin member 124 downwardly in slot 106 to achieve a greater rotational movement of shift shaft 36 without requiring any significant increase in axial movement of control rod 20.

Figure 6A:
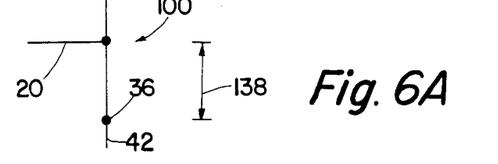
FIGS. 6A–6D are schematic illustrations of several operating positions of the present invention.
Figure 6B:
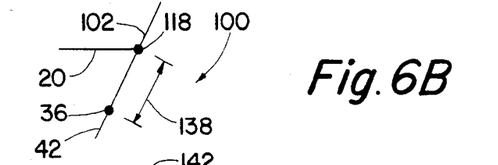

The operation and advantages of the variable mechanical advantage/variable effective length torque arm assembly 100 is schematically illustrated in FIGS. 6A–6D. In FIG. 6A, the torque arm assembly 100 is illustrated in the neutral position whereat the shift shaft 36 and shift finger 42 are substantially vertical and have not engaged a shift block structure of a selected shift rail and thus shift fork 48 and sliding clutch member 68 is axially centered relative to clutch teeth 72 and 76. Assuming it is desired to clutch gear 52 to shaft 56, shift shaft 36 and shift finger 42 must be pivoted in a generally clockwise direction to engage and axially move the shift rail 46 and shift fork 48 in a generally leftward axial direction. The operation of torque arm 100 in the first segment of axial movement of shift fork 48 is illustrated in FIG. 6B and comprises an axial movement of shift fork 48 from the neutral position illustrated in FIG. 2 resulting from a clockwise rotation of shift finger 42 engaging the shift block 44 of the shift rail 46. During this segment of axial movement, the resistance to axial movement of shift rail 46 is less than that required to cause a resilient deflection of spring 134 and thus the torque arm assembly 100 will operate at its first effective length 138. The rotational movement of shift finger 42 and corresponding axial movement of shift fork 48 is sufficient to cause the blocker to engage and to cause initial engagement of friction surfaces 80 and 86.

Figures 6C, 6D:
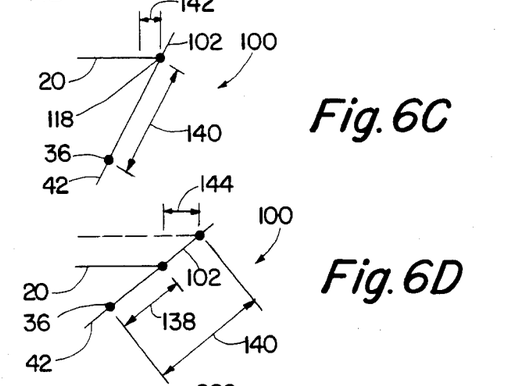

The operation of torque arm 100 in the second segment of axial movement of shift fork 48 and shift rail 46 is illustrated in FIG. 6C and comprises movement of shift fork 48 axially leftwardly to apply a relatively high axial force to the synchronizer clutch friction surfaces to cause the positive clutch members 72 and 74 to rotate at a substantially synchronous speed. As the torque required to be applied to shift shaft 36 to fully apply a frictional synchronizer clutch is greater than that required to overcome the bias of spring 134, the rod end 118 will move in slot 106 of body 102 away from shift shaft axis 36 to define a second longer effective length 140 and increased mechanical advantage associated therewith. As is seen by reference to FIG. 6C, overcoming the bias spring 134 to obtain a higher mechanical advantage/higher effective length torque arm 140 requires a relatively significant additional axial movement 142 of rod end 118 of control rod 20 without producing a significant additional rotational movement of shift shaft 36 and shift finger 42 associated therewith as the second segment of axial movement of shift fork 48 and sliding clutch member 68 carried thereby is relatively insignificant.

Upon achievement of substantially synchronous rotation of positive clutch members 72 and 74, the blocker will unblock the shift shaft 36 and shift finger 42 will achieve a further rotational movement, accompanying by a further axial movement of shift fork 48 and sliding clutch member 68, from the positions shown in FIGS. 6B and 6C to the position shown in FIG. 6D. As the force required for this third segment of axial movement of the shift fork 48 and the shift rail 46 is less than that required to overcome the downward bias of spring 134 on rod end 118 is spring 134 will force rod end 118 downwardly in slot 106 to the nonresiliently deformed position whereat torque arm assembly 10 operates in the shorter effective length 138 condition. As in seen, rotational movement of shift shaft 36 and shift finger 42 to the position shown in FIG. 6D requires little or no additional axial movement of control rod 20. Arrow 144 illustrates the amount of axial movement of control rod 20 which would be required to rotate the shift shaft 36 and shift finger 42 to the position shown in FIG. 6D if a fixed mechanical advantage/fixed effective torque arm length torque arm assembly having an effecitve length 140 were utilized in place of the variable mechanical advantage/variable effective length torque arm assembly 100 of the present invention. As is seen by reference to FIG. 6D, the amount of axial movement of control rod 20 not required as a result of utilizing the torque arm assembly 100 of the present invention is substantial.

Figures 7A, 7B, 7C:
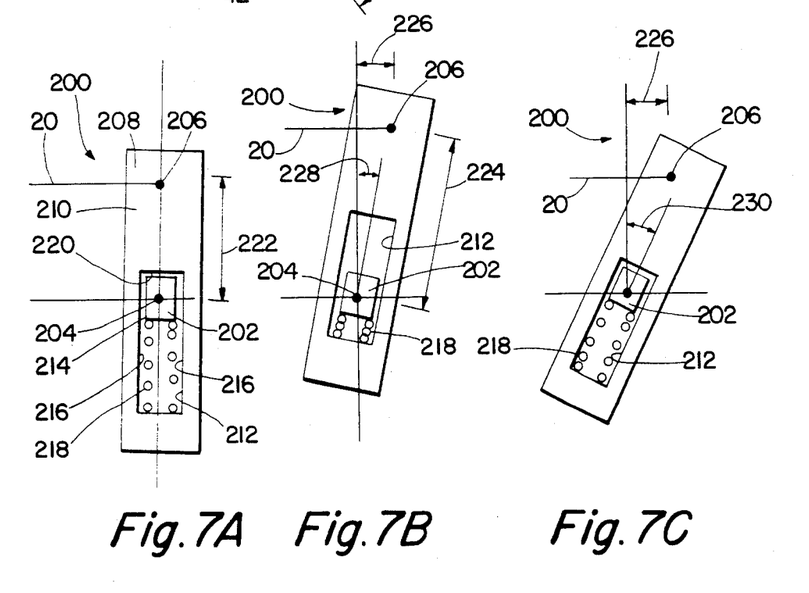
FIGS. 7A–7C are schematic views of an alternate embodiment of the present invention.

A schematic illustration of an alternate embodiment of the present invention and the operation thereof may be seen by reference to FIGS. 7A–7C. FIGS. 7A–7C illustrate a variable mechanical advantage/variable effective length torque arm assembly 200 utilized to convert axial movement of a control rod 20 into rotational movement of a selectively rotatable member 202 pivotable about its axis 204. Briefly, control rod 20 is pivotably mounted at pivot point 206 at end 208 of a rigid body 210 of the torque arm assembly 200. Pivot point 206 defines a pivot axis substantially parallel to axis of rotation 204 of member 202. Rigid body 210 is provided with an axially extending elongated slot 212 in which the end 214 of member 202 is slidably but nonrotationally received. In the embodiment shown, the end 214 of rotatable member 202 is provided with substantially flat sides which are slidably but nonrotatably engaged with flat side walls 216 defining the slot 212. A compression biasing spring 218 biases the member 202 to the end 220 of slot 212 closest to pivot point 206 to define a torque arm having an effective length 222. If the resistance to rotation of member 202 is insufficient to overcome the bias of spring 218 the torque arm assembly 200 will operate in the condition shown in FIGS. 7A. Assuming the torque required to rotate member 202 is sufficient to overcome the bias of spring 218, end 214 of member 202 will move downwardly in slot 212 resulting in a relative axial movment of pivot point 206 away from rotational axis 204 resulting in a torque arm assembly having an effective length 224 greater than effecitve length 222. Assuming control rod 20 has been displaced by an axial distance 226 as seen in FIG. 7B and the resistance to rotation to member 202 becomes less than that required to overcome the bias of spring 218 the spring 218 will force the body 210 downwardly to the position shown in FIG. 7C whereby additional rotation of member 202 will be achieved without the requirement for additional axial movement of control rod 20. The additional rotation of member 202 obtained may be appreciated by comparison of angle of rotation 228 seen in FIG. 7B to the angle of rotation 230 seen in FIG. 7C.

Accordingly, it may be seen that the present invention provides an improved torque arm assembly having a variable mechanical advantage/variable effective length. The variable mechanical advantage/variable effective length torque arm assembly of the present invention is especially advantageous when utilized in connection with a mechanism for shifting a synchronized mechanical transmission wherein the assembly provides the advantages of a relatively longer effective length torque arm for increased mechanical advantage during the segment of the shift operation requiring exertion of substantial force, namely that segment during which the synchronizing clutches are being engaged and also provides the advantage of a relatively shorter effective length for final axial movement of the shift rail and shift fork to the fully engaged position of the selected positive clutch while requiring little if any additional axial movement of the control rod member.

Although a particular preferred embodiment and alternate embodiments of the invention have been disclosed for illustrative purposes, it is understood that variations or modifications thereof which lie within the scope of the below claims are fully contemplated.

I claim:

1. A variable mechanical advantage/variable effective length torque arm assembly for rotating a shaft about a fixed axis of rotation against a resistance, said assembly comprising:
   a relatively rigid body having a first and a second axial end, said body defining an axially extending slot defined by substantially parallel straight axially extending side walls extending from a point spaced from said first end toward said second end;
   a first mounting means fixed to said body adjacent to said first end thereof for pivotably receiving the end of a control rod selectively axially movable along an axis substantially perpendicular to said fixed axis of rotation, said first mounting means defining a pivot axis substantially parallel to said fixed axis of rotation and spaced therefrom;
   a second mounting means comprising a fitting fixed to said shaft having two parallel substantially flat surfaces slidably but nonrotatably engageable with said slot side walls for slidably but nonrotationally fixing said shaft to said body;
   said second mounting means slidably received in said slot for defining a first effective length of said torque arm assembly when said second mounting means is located in a position closest to said first end and for defining a second effective length of said torque arm assembly when said second mounting means is located in a position most distant from said first end whereby a given axial movement of said control rod will result in a rotational movement of said shaft inversely related to the magnitude of separation of said first and second mounting means, and
   resilient biasing means resiliently biasing said other of said first and second mounting means to a position in said slot closest to said first end.

2. A variable mechanical advantage/variable effective length torque arm assembly for axially moving a shift rail of a synchronized positive clutch transmission by selective rotation of a shift shaft about a fixed axis of rotation extending substantially transversely to the axis of said shift rail wherein the axial movement of the synchronized positive clutches from a fully disengaged axial position to a fully engaged axial position comprises a first segment of axial movement wherein an axially movable positive clutch member is moved into engagement with blocking means and frictional synchronizing clutches are initially engaged, a second segment of axial movement wherein the frictional synchronizing clutches are fully engaged to bring the positive clutch members into substantially synchronous rotation and a third segment of axial movement occurring after substantial synchronization of the positive clutch members wherein the axially movable clutch member moves past the blocking means into positive engagement with the another positive clutch member, said second segment of positive clutch axial movement requiring a substantially higher axial force and thereby a substantially higher torque on the rotatable shift shaft than is required during the first and third segments of axial movement of said positive clutch member, said assembly comprising:
   a substantially rigid elongated body;
   first mounting means carried by said body for pivotably receiving the end of a control rod selectively axially movable along an axis substantially perpendicular to said fixed axis of rotation, said first mounting means defining a pivot axis substantially parallel to said fixed axis of rotation;
   second mounting means carried by said body and spaced from said first mounting means for nonrotatably attaching said rigid body to said shift shaft whereby axial movement of said control rod will apply a torque to said shift shaft;
   one of said first and second mounting means being movable in said body relative to the other of said mounting means along a line passing through both of said mounting means to a first position spaced from said other of said mounting means by a first distance and to a second position spaced from said other of said mounting means by a second distance, said second distance greater than said first distance whereby the effective length of the torque arm defined by said body is greater when said one of said mounting means is in said first position than when said one of said mounting means is in said second position; and resilient biasing means for biasing said one of said mounting means to said first position thereof, the biasing force of said biasing means selected so that the torque required to rotate said shift shaft during said first and third segments of axial movement of said positive clutch member are insufficient to cause said one of said mounting means to overcome said bias and move from said first to said second position and the torque required to rotate said shift shaft to fully engage said frictional synchronizing clutches during said second segment of axial movement of said positive clutch member is sufficient to cause said one of said mounting means to overcome said biasing force and move from said first to said second position.

3. The assembly of claim 2 wherein said second mounting means comprises a fixed connection rotatably and axially fixing said body to said shift shaft, said body defines an axially extending slot having a first end axially spaced from said second mounting means by a first distance and a second end axially spaced from said second mounting means by a second distance, said second distance greater than said first distance, said first mounting means comprises a pin member extending substantially parallel to said fixed axis of rotation and slidably received in said slot and said biasing means comprises a spring resiliently urging said pin member toward said first end of said slot.

4. The assembly of claim 3 wherein said spring comprises a compression spring.

5. The assembly of claim 3 wherein said second mounting means comprises a clamped spline connection.

6. The assembly of claim 2 wherein said first mounting means comprises a pivot pin member extending substantially parallel to said fixed axis of rotation and fixedly mounted to said body, said body defines an axially extending slot having a first end axially spaced from said pivot pin member by a first distance and a second end axially spaced from said pivot pin member by a second distance, said second distance greater than said first distance, said slot defined by two substantially parallel flat side walls, said second mounting means comprises a fitting fixedly attached to said shift shaft having opposed generally flat surfaces slidably but nonrotatably received within said slot and said biasing means comprises a spring urging said fitting toward said first end of said slot.

7. The assembly of claim 6 wherein said biasing means is a compression spring.

8. An improved mechanically operated mechanism for selectively shifting a remotely located transmission comprising a shift bar housing assembly mounted to the transmission comprising at least one axially movable shift rail carrying a shift fork fixed thereto, a shift shaft supported in said shift bar housing assembly for rotation about a fixed axis spaced from and extending substantially perpendicularly to the axis of said shift rail, a control rod mounted for axial movement about a substantially fixed axis extending generally perpendicular to said axis of rotation of said shift shaft, a torque arm assembly nonrotatably mounted to said shift shaft at one end thereof and pivotably mounted to an end of said control rod at the other end thereof about a pivot axis extending substantially parallel to said axis of rotation of said shift shaft whereby axial movement of said control rod along its axis will apply a rotating torque to said shift shaft and manually operated lever means for selectively axially moving said control rod along its axis, the improvement comprising;

the effective length of said torque arm being variable and increasing from a first effective length to a second longer effective length with increased resistance to rotation of said shift shaft.

9. The improved mechanism of claim 8 wherein said torque arm comprises a substantially rigid body fixedly mounted to said shift shaft adjacent one end thereof and defining a axially extending elongated slot having a first end spaced from said shift shaft axis of rotaion by a first distance and second end spaced from said shift shaft axis of rotation by a second greater distance, said control rod carrying a pivot pin axially movable therewith and extending generally parallel to said axis of rotation of said shift shaft, said pivot pin slidably received in said elongated slot, and means biasing said pivot pin toward said first end of said slot.

10. An improved mechanism for manually selectively shifting a synchronized positive clutch change gear transmission from a remote location, said transmission of the type wherein the axial movement of said synchronized positive clutches from a fully disengaged axial position to a fully engaged axial position comprises a first segment of axial movement wherein an axially movable positive clutch member is moved into engagement with blocking means and frictional synchronizing clutches are initially engaged, a second segment of axial movement wherein the frictional synchronizing clutches are fully engaged to bring the positive clutch members into substantially synchronous rotation and a third segment of axial movement occurring after substantial synchronization of the positive clutch members wherein the axially movable clutch member moves past the blocking means and into positive engagement with another positive clutch member, said second segment of positive clutch axial movement requiring a substantially higher axial force than required during said first and third segments of axial movement of said positive clutch member, said shifting mechanism comprising a shift bar housing assembly mounted to said transmission including a plurality of substantially parallel axially slidable shift rails each carrying a shift fork thereon for selective axial movement of an axially movable positive clutch member, a shift shaft mounted in said shift bar housing having a fixed axis extending substantially transversely to the axis of said shift rails, said shift shaft mounted for axial movement to align a shift finger carried thereby with a selected shift rail and for rotation about its axis to selectively engage said shift finger with a shift block mechanism carried by the selected shift rail to impart an axial force to said selected shift rail, a control rod having a substantially fixed axis extending substantially transversely to the axis of rotation of said shift rail and spaced therefrom, said control rod mounted for axial movement and for rotation about its axis, a torque arm assembly having a first end fixed to said shift shaft for axial and rotational movement therewith and a pivotal connection to said control rod including a pivot pin defining a pivotal axis extending generally parallel to the rotational axis of said shift shaft whereby axial movement of said control rod will impart a rotational torque to said shift shaft and rotation of said control rod about its axis will impart an axial force to said shift shaft, and a remotely located lever for selectively applying rotational and axial forces to said control rod, said improvement comprising:

said torque arm assembly defined by a substantially rigid body defining an axially extending slot having a first end spaced from the axis of said shift shaft by a first distance and a second end spaced from the axis of said shift shaft by a second distance, said second distance greater than said first distance, and resilient biasing means biasing said pivot pin toward said first end of said slot, said biasing means selected wherein the resistance to rotational movement of said shift shaft during said first and third segments of axial movement of a selected positive clutch member is insufficient to cause said pivot pin to overcome the bias of said biasing means to move from said first end to said second end of said slot and the torque required to rotate said shift shaft to fully engage said frictional synchronizing clutches during said second segment of axial movement of said selected axially movable positive clutch member is sufficient to overcome the bias of said biasing means allowing said pivot pin member to move toward said second end of said slot.

* * * * *